(12) United States Patent
Hartloff et al.

(10) Patent No.: US 9,967,101 B2
(45) Date of Patent: May 8, 2018

(54) PRIVACY PRESERVING SET-BASED BIOMETRIC AUTHENTICATION

(71) Applicant: FUJITSU LIMITED, Kawasaki-shi, Kanagawa (JP)

(72) Inventors: Jesse Hartloff, Amherst, NY (US); Avradip Mandal, San Jose, CA (US); Arnab Roy, Santa Clara, CA (US)

(73) Assignee: FUJITSU LIMITED, Kawasaki (JP)

( * ) Notice: Subject to any disclaimer, the term of this patent is extended or adjusted under 35 U.S.C. 154(b) by 650 days.

(21) Appl. No.: 14/560,435

(22) Filed: Dec. 4, 2014

(65) Prior Publication Data

US 2016/0164682 A1    Jun. 9, 2016

(51) Int. Cl.
*G06F 21/32*   (2013.01)
*H04L 9/32*    (2006.01)
(Continued)

(52) U.S. Cl.
CPC ............ *H04L 9/3231* (2013.01); *G06F 21/32* (2013.01); *G06K 9/00073* (2013.01);
(Continued)

(58) Field of Classification Search
CPC .......... G06F 21/32; G06K 2009/00953; G06K 9/00073; G06K 9/00885; G06K 9/00926;
(Continued)

(56) References Cited

U.S. PATENT DOCUMENTS

2002/0188854 A1* 12/2002 Heaven ................ G06F 21/10
                                                                                                  713/186
2005/0206501 A1*  9/2005 Farhat .................. G06F 21/32
                                                                                                  340/5.82
(Continued)

OTHER PUBLICATIONS

Christian Rathgeb et al, "A survey on biometric cryptosystems and cancelable biometrics", EURASIP Journal on Information Security, vol. 2011, No. 1 (Jan. 1, 2011).*
(Continued)

*Primary Examiner* — Theodore C Parsons
(74) *Attorney, Agent, or Firm* — Maschoff Brennan

(57) ABSTRACT

A method includes extracting a set of enrollment feature points from an enrollment biometric measurement. The method also includes randomly selecting one or more enrollment code words from an error correction code. The method also includes determining obfuscated enrollment feature point data describing an obfuscated version of the set of feature points that is obfuscated using the one or more enrollment code words. The method also includes determining obfuscated enrollment code word data describing an obfuscated version of the one or more enrollment code words that is obfuscated using a random enrollment polynomial. The method also includes determining an enrollment biometric template including the obfuscated enrollment feature point data and the obfuscated enrollment code word data. The method includes generating a public key based on the random enrollment polynomial that obfuscates the random enrollment polynomial. The method also includes determining enrollment data including the enrollment biometric template.

18 Claims, 8 Drawing Sheets

(51) Int. Cl.
  *H04L 29/06* (2006.01)
  *G06K 9/00* (2006.01)
  *H04L 9/30* (2006.01)

(52) U.S. Cl.
  CPC ..... *G06K 9/00885* (2013.01); *G06K 9/00926* (2013.01); *H04L 9/304* (2013.01); *H04L 9/3026* (2013.01); *H04L 9/3271* (2013.01); *H04L 63/0861* (2013.01); *G06K 2009/00953* (2013.01); *H04L 2209/16* (2013.01)

(58) Field of Classification Search
  CPC ......... H04L 63/0861; H04L 9/08; H04L 9/30; H04L 9/32; H04L 9/3231; H04L 9/3271
  See application file for complete search history.

(56) References Cited

U.S. PATENT DOCUMENTS

| | | | | |
|---|---|---|---|---|
| 2011/0066859 | A1* | 3/2011 | Iyer | H04L 9/14 713/176 |
| 2013/0174243 | A1* | 7/2013 | Inatomi | H04L 9/3231 726/7 |

OTHER PUBLICATIONS

Coron, "Cryptanalysis of a Public-Key Encryption Scheme Based on the Polynomial Reconstruction Problem", Public Key Cryptography—PKC 2004, Lecture Notes in Computer Science, vol. 2947 (Springer 2004).*

"Public Key Infrastructure", accessed at https://en.wikipedia.org/w/index.php?title=Public key infrastructure&oldid=635790183, accessed on Jan. 6, 2016, pp. 5.

"Public-key cryptography", accessed at https://en.wikipedia.org/w/index.php?title=Public-key cryptography&oldid=635623982, accessed on Jan. 6, 2016, pp. 14.

Augot, D. and Finiasz, M., "A Public Key Encryption Scheme Based on the Polynomial Reconstruction Problem", In Correct System Design, vol. 2656, 2003, pp. 1-16.

Bao, F., et al., "Public Key Cryptography", PKC 2004: 7th International Workshop on Theory and Practice in Public Key Cryptography, Mar. 1-4, 2004, pp. 21-22.

Rathgeb, C. and Uhl, A., "A survey on biometric cryptosystems and cancelable biometrics", EURASIP Journal on Information Security, vol. 2011, No. 3, Jan. 3, 2011, pp. 1-25.

European Search Report dated Jun. 10, 2016 as received in Application No. 15180334.3.

A. Juels and M. Sudan. A fuzzy vault scheme. Des. Codes Cryptography, 38(2):237-257, Feb. 2006.

A. Nagar, K. Nandakumar, and A. K. Jain. Securing fingerprint template: Fuzzy vault with minutiae descriptors. In ICPR, pp. 1-4, Dec. 2008.

M. Morse, J. Hartloff, T. Effland, J. Schuler, J. Cordaro, S. Tulyakov, A. Rudra, and V. Govindaraju. Secure fingerprint matching with generic local structures. In Computer Vision and Pattern Recognition Workshops (CVPRW), 2014 IEEE Conference on, Jun. 2014.

T. E. Boult, W. J. Scheirer, and R. Woodworth. Revocable fingerprint biotokens: Accuracy and security analysis. In CVPR, Jun. 2007.

Dodis, Y., Ostrovsky, R., Reyzin, L., and Smith, A., Fuzzy extractors: How to generate strong keys from biometrics and other noisy data, SIAM J. Connput. 38(1), 97-139 (Jan. 2008).

Scheirer, W. J. and Boult, T. E., Cracking fuzzy vaults and biometric encryption, in Proceedings of Biometrics Symposium, 1-6 (Sep. 2007).

* cited by examiner

PRIVACY PRESERVING SET-BASED BIOMETRIC AUTHENTICATION

FIELD

The embodiments discussed herein are related to privacy preserving set-based biometric authentication.

BACKGROUND

Security may become important for electronic devices and services. As security increases in importance, innovators are looking to new or different forms of authentication. One form of authentication may include biometric authentication. Biometric authentication may include measuring and authenticating a user's identity via a unique biometric characteristic. The unique biometric characteristics may include one or more of a user's fingerprints, iris, veins, DNA, etc. Biometric authentication may have the advantage of allowing users to be authenticated without having to remember a password.

SUMMARY

According to an aspect of an embodiment, a method includes extracting a set of enrollment feature points from an enrollment biometric measurement. The method also includes randomly selecting one or more enrollment code words from an error correction code. The method also includes determining obfuscated enrollment feature point data describing an obfuscated version of the set of feature points that is obfuscated using the one or more enrollment code words. The method also includes determining obfuscated enrollment code word data describing an obfuscated version of the one or more enrollment code words that is obfuscated using a random enrollment polynomial. The method also includes determining an enrollment biometric template including the obfuscated enrollment feature point data and the obfuscated enrollment code word data. The method also includes determining enrollment data including the enrollment biometric template. The enrollment data may be configured to keep the one or more enrollment code words and the random enrollment polynomial secret.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1A:
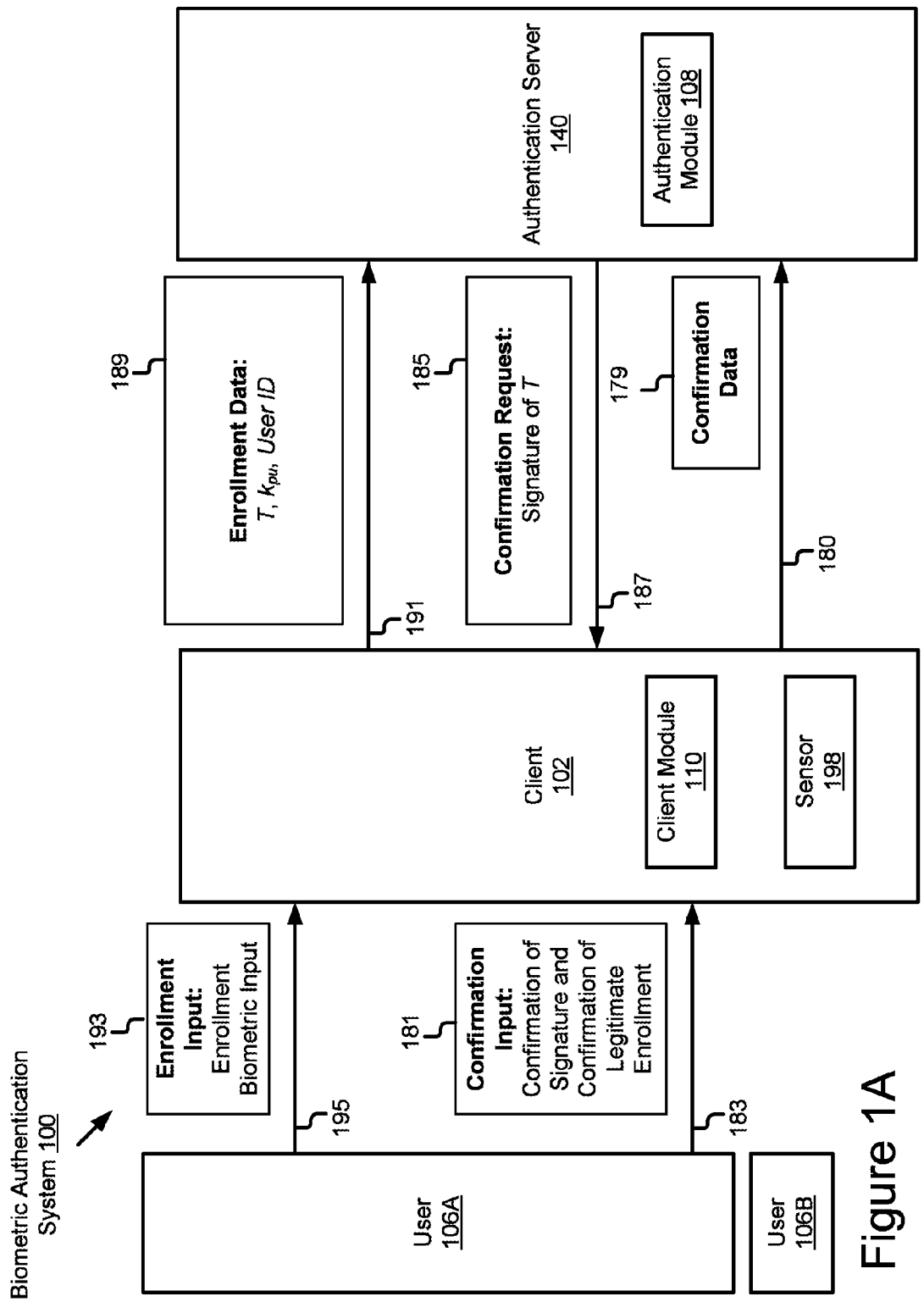
FIGS. 1A and 1B are block diagrams of an example biometric authentication system.

The embodiments discussed herein are related to providing set-based biometric authentication.

In biometric authentication, a user may be unable to change the user's biometric characteristics. For example, a user may enroll a biometric template including biometric data describing one or more unique characteristics of the user (e.g., fingerprint, iris pattern, etc.). If the biometric template is compromised and if the user is unable to change the unique characteristic described by the biometric template, then biometric authentication may become ineffective for the user. For this reason, biometric authentication systems require a strong privacy guarantee.

Systems exist that attempt to provide strong privacy guarantees for biometric authentication systems. Unfortunately, these systems have numerous deficiencies.

One such system may be referred to as a "relational hash." The relational hash approach includes a primitive that is used as part of the system to take a biometric measurement of an iris or a palm vein. The biometric measurement included in the relational hash approach includes a hamming distance. This approach has known vulnerabilities making it susceptible to attack. In particular, the relational hash approach is particularly susceptible to a replay attack. The relational hash approach also has numerous limitations which may make it not desirable for deployment. For example, the relational hash approach cannot be used for biometric measurements including fingerprint measurements. The relational hash approach also does not use error-tolerant set intersection for distance measurement of biometric features.

Another approach is known as a "fuzzy vault." This approach may be implemented for fingerprint template security. This approach has numerous known vulnerabilities making it susceptible to attack. For example, the fuzzy vault approach may be overcome by a replay attack or multiple instance attack. This approach also has the limitation of including a large template size, making it less desirable for deployment.

Another approach is the use of biotokens. However, this approach includes the use of a proprietary fingerprint template security system. The proprietary nature of this approach may make it less desirable for deployment. For example, the technology underlying this approach may not be open for inspection and review to confirm that this approach maintains the secrecy of biometric data provided by users.

The deficiencies of these and other systems may be overcome by the use of set-based biometric authentication. As will be explained in more detail below with reference to FIG. 1A, a biometric authentication system may include a client and an authentication server. The client may include a client module including code and routines configured to provide the functionality of the client described below. The authentication server may include an authentication module including code and routines configured to provide the functionality of the authentication server described below. The client may be operated by an enrollment user and a verification user. The enrollment user and the verification user may be the same person. The authentication server may provide a biometric authentication service. The biometric authentication service may include two processes: (1) an enrollment process; and (2) a verification process. The enrollment user may enroll with the biometric authentication service using the enrollment process. Later, the authentication server may determine whether the verification user is the same as the enrollment user during the verification process.

Examples of the enrollment process and the verification process provided by the biometric authentication service according to some embodiments are described below. A graphical depiction of the symbols used to describe the enrollment process is depicted in FIG. 3A. A graphical depiction of the symbols used to describe the verification process is depicted in FIG. 3B. The users, client, client module, authentication server, and authentication module described below with reference to the enrollment process and the verification process may be the same as those described below with reference to FIGS. 1A-5.

The client may begin an enrollment process in which the enrollment user of the client enrolls with the authentication server. The client may provide an enrollment biometric template and a public key to the authentication server. The enrollment biometric template may include a set of obfuscated feature point data and a set of obfuscated code word data. The enrollment biometric template may be represented by "$T=\{(y_i, \gamma_i), \ldots, (y_n, \gamma_n)\}$", wherein the symbol "$y_i$" represents obfuscated enrollment feature point data, the symbol "$\gamma_i$" represents obfuscated enrollment code word data and the symbol "T" represents the enrollment biometric template. The symbol "$y_n$" may represent that there may be any positive integer of obfuscated enrollment feature point data included in the set of obfuscated enrollment feature point data. The symbol "$\gamma_n$" may represent that there may be any positive integer of obfuscated enrollment code word data included in the set of obfuscated enrollment code word data. In some implementations, the set of obfuscated enrollment code word data may correspond to the set of obfuscated enrollment feature point data. For example, in some implementations the enrollment biometric template may include one obfuscated enrollment code word for each obfuscated enrollment feature point.

The obfuscated enrollment feature point data included in the enrollment biometric template may describe a set of one or more obfuscated enrollment feature points of an enrollment biometric input provided by the enrollment user. For example, the enrollment user may provide an enrollment biometric input to the client. The enrollment biometric input may include a biometric measurement of the enrollment user. The client module may receive the enrollment biometric input, determine feature point data describing one or more feature points of the enrollment biometric input, and determine obfuscated feature point data describing an obfuscated version of the feature point data.

The enrollment biometric input may include a fingerprint scan, retinal scan or any other biometric input associated with the enrollment user. The enrollment biometric input may be represented by "$B=b_1 \ldots b_n$," where the symbol "$b_1$" represents the enrollment feature point data describing a first feature of the enrollment biometric input and the symbols "$b_1 \ldots b_n$" represents a set of enrollment feature point data describing any positive integer of features included in the enrollment biometric input and the symbol "B" represents the enrollment biometric input.

The obfuscated enrollment feature point data may be determined by the client module using one or more code words. The client module may randomly select one or more code words from an Error Correction Code ("ECC"). The ECC may be a linear error correcting code scheme or any other error correcting code scheme. In some implementations, the client module may select one code word for each feature point. The code word may then be used to obfuscate the one or more feature points included in the enrollment biometric input. For example, the client module may receive the biometric input, determine the enrollment feature point data, randomly select one or more code words from the ECC, and use the one or more code words to determine obfuscated feature point data based on the one or more code words and the enrollment feature point data.

The obfuscated feature point data may be represented by "$y_i = b_i \oplus c_i$," where the symbol "$b_i$" represents an un-obfuscated version of the enrollment feature point data, the symbol "$c_i$" represents the one or more randomly selected enrollment code words and the symbol "$y_i$" represents the obfuscated enrollment feature point data. The symbol "$\oplus$" represents an exclusive or function.

Although the authentication server may receive the enrollment biometric template including the obfuscated enrollment feature point data ($y_i = b_i \oplus c_i$), the authentication server is unable to determine the un-obfuscated version of the enrollment feature point data ($b_i$) based on the obfuscated enrollment feature point data included in the enrollment biometric template. For example, if the enrollment feature point data is obfuscated by the one or more enrollment code words ($b_i \oplus c_i$), and the one or more enrollment code words are randomly selected from the ECC and kept secret from the authentication server, then the authentication server cannot decode the un-obfuscated version of the feature point data ($b_i$) from the obfuscated feature point data ($y_i$).

The client module may keep the one or more randomly selected enrollment code words secret using a random enrollment polynomial. The client module may determine the random enrollment polynomial. The random enrollment polynomial may be represented by the symbol "$p_s$." The client may keep the random enrollment polynomial secret from the authentication server by not providing an un-obfuscated version of the random enrollment polynomial to the authentication server.

The client module may generate obfuscated enrollment code word data based on the one or more randomly selected code words and the random polynomial. The obfuscated enrollment code word data may be represented by "$\gamma_i = p_s(c_i)$," where the symbol "$p_s$" represents the random enrollment polynomial, the symbol "$c_i$" represents the one or more randomly selected enrollment code words and the symbol "$\gamma_i$" represents the obfuscated enrollment code word data.

Although the authentication server may have access to the enrollment biometric template including the obfuscated enrollment code word data ($\gamma_i = p_s(c_i)$), the authentication server is unable to determine the one or more randomly selected enrollment code words ($c_i$) included in the obfuscated enrollment code word data since the random enrollment polynomial ($p_s$) is a secret that is not known by the authentication server. In this way the one or more randomly selected enrollment code words are kept secret from the authentication server. Additionally, since the one or more randomly selected enrollment code words are kept secret from the authentication server, the authentication server also cannot determine the un-obfuscated version of the enrollment feature point data ($b_i$) from the obfuscated feature point data ($y_i = b_i \oplus c_i$). In this way the un-obfuscated version of the enrollment feature point data associated with the enrollment biometric input of the enrollment user is kept secret from the authentication server.

In addition to the enrollment biometric template, the client may provide a public key to the authentication server. The public key may be generated by the client module based on the random enrollment polynomial. For example, the random enrollment polynomial may be used to seed the generation of the public key. The public key may be represented by "$k_{pu}=\text{public}(p_s)$," where the symbol "$p_s$" represents the random enrollment polynomial and the symbol "$k_{pu}$" represents the public key.

In addition to the enrollment biometric template and the public key, the client may also provide the authentication server with the user ID. The user ID may include a unique identifier for the enrollment user while not including an un-obfuscated version of the enrollment feature point data associated with the enrollment biometric input of the enrollment user. The authentication server may associate the user ID with the enrollment biometric template and the public key. Although the enrollment biometric template, the public key and the user ID are provided to the authentication server, the one or more random enrollment code words and the random enrollment polynomial are kept secret from the authentication server.

The client may begin a verification process by providing a verification request to the authentication server. The verification request may include the user ID for the enrollment user. For example, the verification user may wish to authenticate as the enrollment user, and so, the verification user may provide a request input to the client to begin the verification process. The client module may retrieve the user identification data ("user ID") from a memory of the client, generate the verification request and provide the verification request to the authentication server responsive to receiving the request input from the verification user.

Responsive to receiving the verification request, the authentication server may provide a verification challenge to the client. The verification challenge may include the enrollment biometric template and a random number value. The data included in the verification challenge may be represented by "$(T, r)$," where the symbol "$T$" represents the enrollment biometric template and the symbol "$r$" represents the random number value.

The verification user may provide a verification biometric input to the client in order to authenticate that they are the enrollment user. As will be explained in more detail below, the client module may use the verification feature point data determined from the verification biometric input to recover a private key associated with the public key generated during the enrollment process. The private key may be used by the authentication server to authenticate that the verification user is the enrollment user.

The client module may receive the verification biometric input provided by the verification user and determine verification feature point data describing one or more feature points of the verification biometric input. The verification biometric input may be a similar type as provided by the enrollment user during the enrollment process. For example, if the enrollment user provided a fingerprint scan as the enrollment biometric input during the enrollment process, then the verification user may be required by the client module to provide a fingerprint scan during the verification process.

The verification biometric input may be represented by the "$B'=b_1' \ldots b_n'$," where "$b_1'$" represents the feature point data describing a first feature of the verification biometric input and "$b_1' \ldots b_n'$" represents a set of verification feature point data describing any positive integer of features included in the verification biometric input and "$B'$" represents the verification biometric input.

For each feature point included in the set of verification feature point data, the client module may determine one or more verification code words. In some implementations, the client module may determine the one or more verification code words based on the obfuscated enrollment feature point data ($y_i$) included in the enrollment biometric template ($T=\{(y_i, \gamma_i), \ldots, (y_n, \gamma_n)\}$), which was included in the verification challenge. For example, the client module may determine the one or more verification code words according to "$c'_i=\text{decode}(y_i \oplus b'_j)$," where the symbol "$y_i$" represents the obfuscated enrollment feature point data ($y_i$) included in the enrollment biometric template, the symbol "$b'_j$" represents verification feature point data describing an un-obfuscated version of one or more features included in the verification biometric input and the symbol "$c'_i$" represents a verification code word determined based on the obfuscated enrollment feature point data ($y_i$) and verification feature point data ($b'_j$). The client module may add the one or more verification code words to a candidate set for decoding represented by the symbol "$S$."

The client may apply a weighting process to determine whether to modify the candidate set for decoding. The weighting process described by this paragraph is graphically depicted in FIG. 3B with reference to element 345. The client module may determine a weight based on the one or more verification code words ($c'_i$), the obfuscated enrollment feature point data ($y_i$) and the verification feature point data ($b'_j$). For example, the client module may determine the weight according to "$wt(c'_i \oplus y_i \oplus b'_j)$." The client module may compare the weight to a threshold provided by the user or an administrator. If the weight is less than the threshold, then the client module may determine the obfuscated enrollment code word data ($\gamma_i$) from the enrollment biometric template and add the obfuscated enrollment code data and the one or more verification code words ($c'_i$) to the candidate set for decoding (S) as "$(c'_i, \gamma_i)$."

In some implementations, the client module may include a decoder for determining a verification polynomial from the candidate set for decoding. For example, the client module may include code and routines configured to provide a Welch-Berlekamp decoder. The client module may decode the candidate set for decoding using the decoder to determine a verification polynomial. The verification polynomial may be represented by the symbol "$p_s'$" as described below.

The client module may determine the private key using the verification polynomial ($p_s'$). The private key may be represented by "$k_{pr}=\text{private}(p_s')$," where the symbol "$p_s'$" represents the verification polynomial and the symbol "$k_{pr}$" represents the private key.

The client module may sign the random number value received in the verification using the private key. The signed random number value may be represented by "$d=\text{sign}(k_{pr}, r)$," where the symbol "$k_{pr}$" represents the private key, the symbol "$r$" represents the random number value and the symbol "$d$" represents the signed random number value.

The client module may provide a challenge answer to the authentication server. The challenge answer may be responsive to the verification challenge. The challenge answer may include the signed random number value. The authentication module may verify if the private key used to sign the random number value corresponds to the public key received during the enrollment process. If the private key corresponds to the public key, then the verification user is authenticated as the enrollment user by the authentication module. If the private key does not correspond to the public key, then the verification user is not authenticated as the enrollment user by the authentication module.

As explained above, critical data such as the features of users' biometric inputs may be obfuscated when transmitted between the client and the authentication server. As such, communications between the client and the authentication may not require security such as encryption. The authentication server may not have access to un-obfuscated versions of the enrollment feature point data or the verification feature point data. As such, data necessary to replicate a biometric measurement of a user may not be leaked by the authentication server. This is beneficial, for example, since the authentication server itself may be an adversary.

Embodiments of the present invention will be explained with reference to the accompanying drawings.

FIG. 1A is a block diagram of an example biometric authentication system 100 providing an example enrollment process, arranged in accordance with at least one embodiment described herein. The biometric authentication system 100 may include a client 102 and an authentication server 140. The client 102 may be accessible by one or more users 106A, 106B (referred to collectively as "user 106" or "users 106"; referred to individually as "user 106A" or "user 106B"). The users 106 may include human users of the client 102, or non-human users having biometric characteristics. The users 106 may use the client 102 to access the authentication server 140. For example, the user 106A may use the client 102 to access a biometric authentication service provided by an authentication module 108 of the authentication server 140. The users 106 may include different humans or the same human accessing the client 102 at different times. As will be explained below, the authentication server 140 may provide the biometric authentication service. The biometric authentication service may be used to determine whether the users 106 are the same person or different people. For example, during the enrollment process the user 106 may be referred to as an "enrollment user 106" and during the verification process the user 106 may be referred to as a "verification user 106." The verification process may determine whether the enrollment user 106 and the verification user 106 are the same or different people.

The authentication server 140 may include a processor-based computing device. For example, the authentication server 140 may include a hardware server device or any other processor-based computing device configured to function as a server.

The authentication server 140 includes the authentication module 108. The authentication module 108 may include code and routines configured to provide the biometric authentication service. The authentication module 108 may be stored on a memory or other computer-readable medium of the authentication server 140 or that is accessible to the authentication server 140. The authentication module 108 may be executable by a processor of the authentication server 140 to perform one or more of the operations described herein. The authentication module 108 will be described in more detail below with reference to FIGS. 1A-5.

The client 102 may include a processor-based computing device. For example, the client 102 may include a mobile phone, a smartphone, a tablet computer, a laptop computer, a desktop computer, a set-top box, or a connected device (e.g., a smartwatch, smart glasses, a smart pedometer, or any other connected device).

The client 102 may include a client module 110 and one or more sensors 198. The sensor 198 may include a hardware device communicatively coupled to the client 102. Alternatively, the sensor 198 may include a component of the client 102. The client module 110 may include code and routines stored on a memory or other computer-readable medium of the client 102 or that is accessible to the client 102. The client module 110 may be executable by a processor of the client 102 to perform one or more of the operations described herein.

In some embodiments, the authentication module 108 is configured to provide some or all of the functionality of the client module 110. In some embodiments, the authentication module 108 or the client module 110 may be implemented using hardware including a field-programmable gate array (FPGA) or an application-specific integrated circuit (ASIC). In some other instances, the authentication module 108 or the client module 110 may be implemented using a combination of hardware and software. Thus, the authentication module 108 or the client module 110 may be implemented as a hardware device.

The client 102 may include the sensor 198. Although only one sensor 198 is depicted in FIG. 1A, more generally the client 102 may include one or more sensors 198. The sensor 198 may include a hardware device configured to measure one or more biological characteristics of the user 106. The measurements may include biometric measurements. The biometric measurements may describe a unique feature of the user 106. For example, the sensor 198 may include one or more of: a fingerprint scanner; a camera configured to capture an image of an iris; a device configured to measure the DNA of the user 106; a heart rate monitor configured to capture a heart rate of the user 106; a wearable electromyography sensor configured to capture electrical activity produced by the skeletal muscles of the user 106; or any other sensor 198 configured to capture a biometric measurement associated with the user 106.

The client module 110 may include code and routines configured to determine the enrollment data 189 and the confirmation data 179. The enrollment data 189 and the confirmation data 179 are described in more detail below.

In some implementations, the client module 110 may include code and routines configured to receive an enrollment input 193 from the sensor 198 and determine the enrollment biometric template based on the enrollment input 193. The determination of the enrollment biometric template was described above, and so, that description will not be repeated here.

In some implementations, the client module 110 may include code and routines configured to determine the public key associated with the enrollment biometric template. The determination of the public key was described above, and so, that description will not be repeated here.

The biometric authentication service provided by the authentication module 108 may include: (1) an enrollment process and (2) a verification process. The enrollment process for the biometric authentication service provided by the authentication module 108 will now be described according to one embodiment. The verification process provided by the authentication module 108 will be described below with reference to FIG. 1B according to one embodiment.

With reference to elements 195 and 193 of FIG. 1A, an enrollment process for the biometric authentication service provided by the authentication module 108 may be initiated. The enrollment user 106 may provide 195 an enrollment input 193. The enrollment input may include the enrollment biometric input. The enrollment biometric input may include the biometric measurement of the enrollment user 106. The biometric measurement of the enrollment user 106 may include a measurement of a unique feature of the enrollment user 106. For example, the biometric measurement may include a fingerprint scan, retinal scan or any other biometric measurement associated with the enrollment user 106.

The client 102 may receive 195 the enrollment input 193. The client module 110 may determine the enrollment biometric template, public key and user ID for the enrollment user 106. The enrollment biometric template may be determined by the client module 110 based on the enrollment input 193 provided by the enrollment user 106. The client 102 may provide 191 enrollment data 189 to the authentication server 140. The enrollment data 189 may include the enrollment biometric template, public key and user ID for the enrollment user 106. The enrollment biometric template may be represented in element 189 of FIG. 1A by the symbol "T." The public key may be represented in element 189 of FIG. 1A by the symbol "$k_{pu}$." The user ID may be represented in element 189 of FIG. 1A by the symbol "User ID."

The authentication server 140 may receive 191 the enrollment data 189. The authentication module 108 may store the enrollment data 189 on a memory or other computer-readable medium of the authentication server 140 or that is accessible to the authentication server 140.

The authentication server 140 may provide 187 a confirmation request 185 to the client 102. The confirmation request may include a signature of the enrollment biometric template included in the enrollment data 189.

The client 102 may receive 187 the confirmation request 185. The client 102 may present the signature of the enrollment biometric template to the enrollment user 106. The enrollment user 106 may provide 183 a confirmation input 181 to the client 102. The confirmation input 181 may include an input confirming the signature included in the confirmation request 185. The confirmation input 181 may also include an input confirming that the authentication server 140 has received a legitimate enrollment of the enrollment user 106 with the authentication service provided by the authentication module 108.

The client 102 receives 183 the confirmation input 181. The client 102 provides 180 confirmation data 179 to the authentication server 140. The confirmation input 181 may include data confirming the signature included in the confirmation request 185. The confirmation input 181 may also include data confirming the legitimate enrollment of the enrollment user 106 with the authentication service provided by the authentication module 108.

The authentication server 140 receives 180 the confirmation data 179. The authentication module 108 may determine that the enrollment user 106 is a legitimate enrollee with the authentication service provided by the authentication module 108 based on receipt 180 of the confirmation data 179.

Figure 1B:
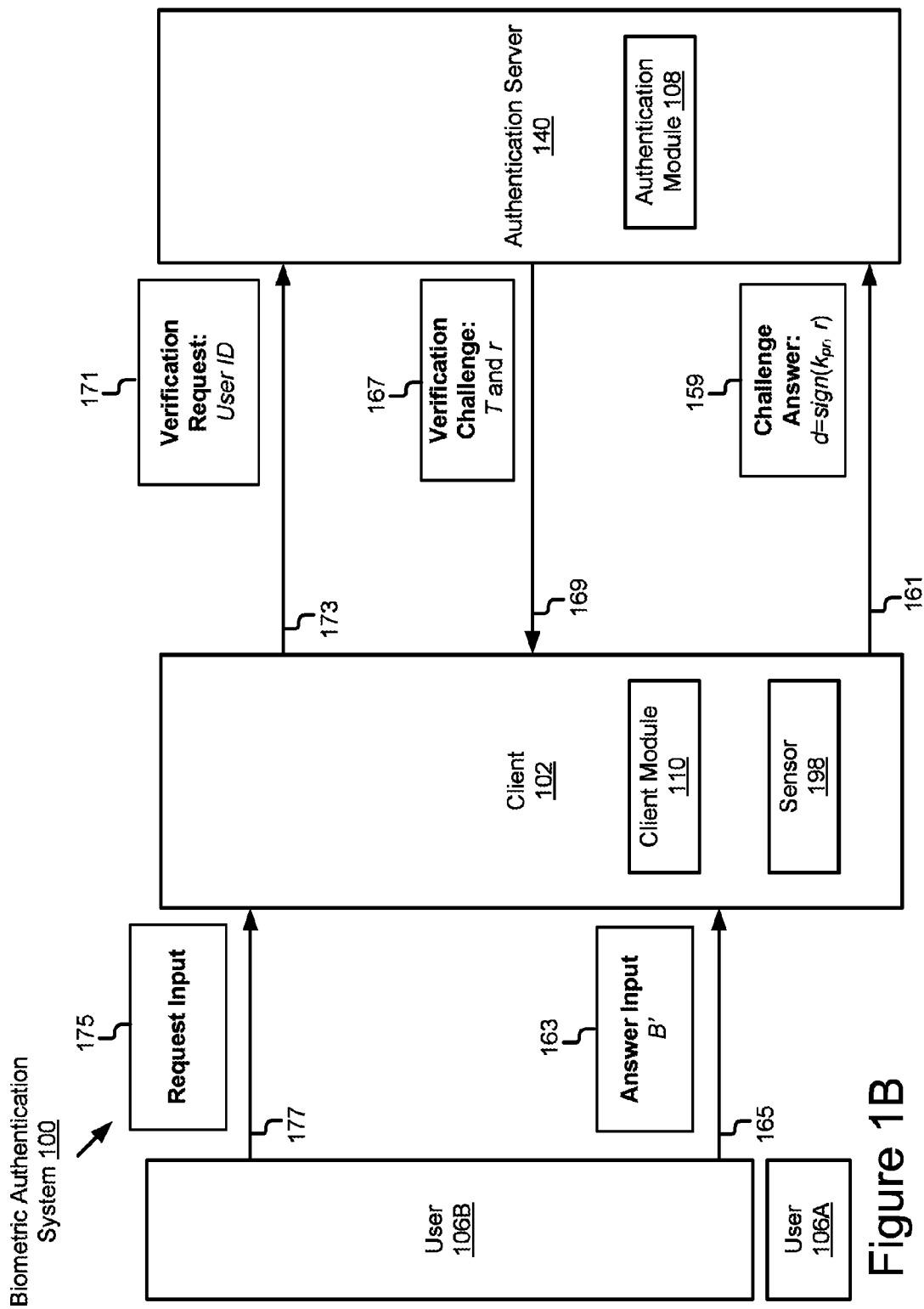

FIG. 1B is a block diagram of an example biometric authentication system 100 providing an example verification process, arranged in accordance with at least one embodiment described herein. The client 102, the client module 110, the user 106, the authentication server 140, and the authentication module 108 may be the same as those described above with respect to FIG. 1A, and so, these descriptions will not be repeated here.

The verification user 106 may provide 177 a request input 175 to the client. The request input may include an indication to begin the verification process.

The client 102 receives 177 the request input 175. The client 102 provides 173 a verification request 171 to the authentication server 140. The verification request 171 may include the user ID included in the enrollment data 189 described above with reference to FIG. 1A.

Referring to FIG. 1B, the authentication server 140 may receive 173 the verification request 171. The authentication module 108 may determine based on the user ID included in the verification request 171 that the verification user 106 requests to be authenticated as the enrollment user 106. The authentication server 140 may provide 169 the verification challenge 167 to the client. The verification challenge may include the enrollment biometric template associated with the enrollment user 106 and a random number value. The enrollment biometric template may be represented by the symbol "T" and the random number value may be represented by the symbol "r" in element 167 of FIG. 1B. The enrollment biometric template may be the same as the enrollment biometric template included in the enrollment data 189 described above with reference to FIG. 1A.

In addition to the functionality described above, the client module 110 may include code and routines configured to determine the verification request 171 and the challenge answer 159. The verification request 171 and the challenge answer 159 are described in more detail below.

Referring to FIG. 1B, the client 102 may receive 169 the verification challenge 167. The client 102 may prompt the verification user 106 to provide the client 102 with a verification biometric input. The verification user 106 may provide 165 an answer input 163 to the client 102. The answer input 163 may include a verification biometric input. The verification biometric input may be represented by the symbol "B" in element 163 of FIG. 1B. The client module 110 may determine a private key based in part on data included in the verification biometric input. The private key may be represented by the symbol "$k_{pr}$" in element 159 of FIG. 1B. The private key may correspond to the public key included in the enrollment data 189 described above with reference to FIG. 1A. For example, the private key and the public key may form a cryptographic key pair.

Referring to FIG. 1B, the client module 110 may sign the random number value using the private key. The client 102 may provide 161 a challenge answer 159 to the authentication server 140. The challenge answer 159 may include the signed random number value. The signed random number value may be represented by "$d=\text{sign}(k_{pr}, r)$" in element 159 of FIG. 1B. Referring to element 159, the symbol "$k_{pr}$" represents the private key, the symbol "r" represents the random number value and the symbol "d" represents the signed random number value.

The authentication server 140 may receive 161 the challenge answer 159. The authentication module 108 may analyze the challenge answer to determine whether the private key corresponds to the public key, thereby indicating that the verification user 106 is the same person as the enrollment user 106.

Figure 1C:
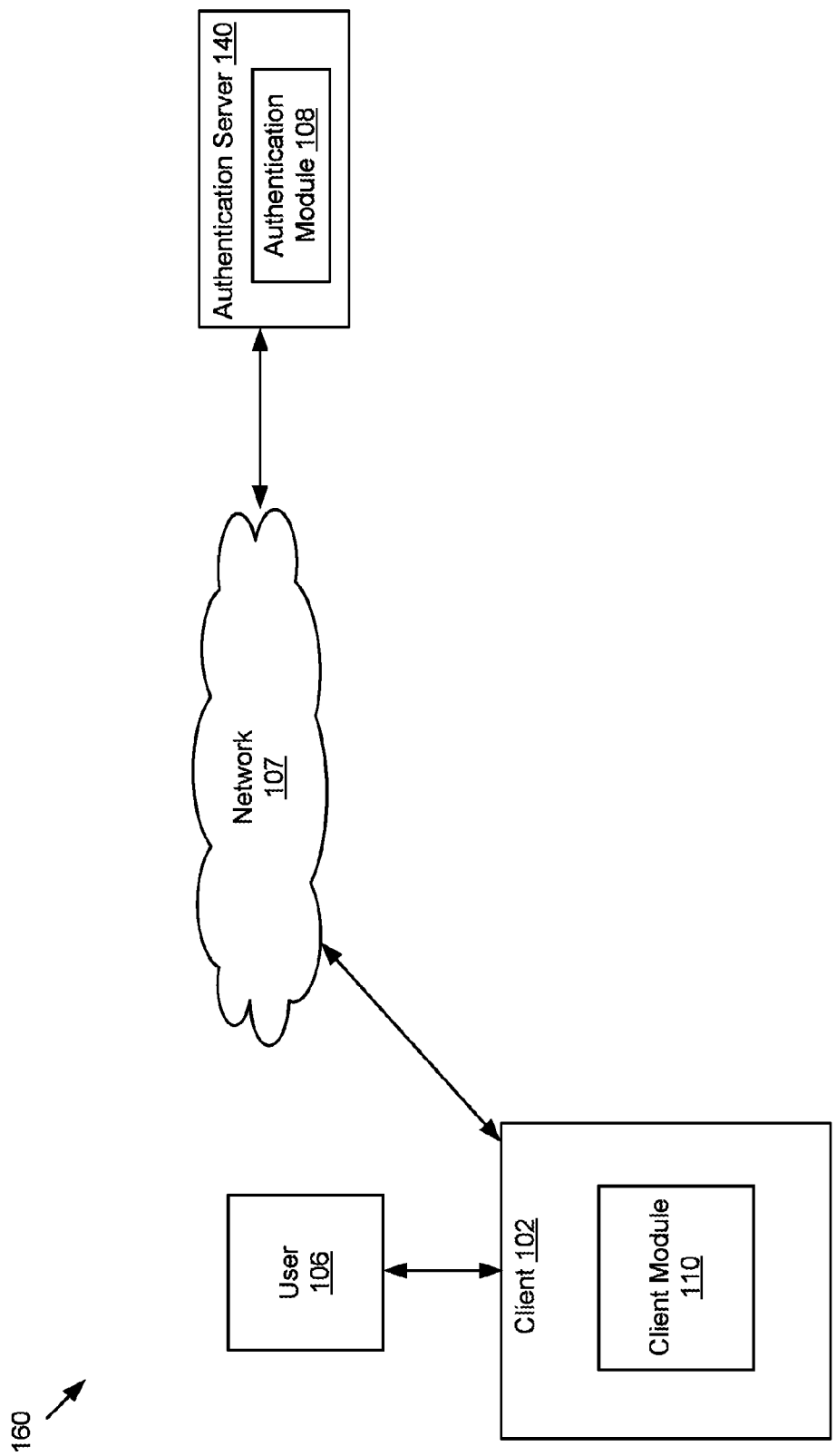
FIG. 1C is a block diagram of an example operating environment in which a client module or authentication module may be implemented to provide set-based biometric authentication.

FIG. 1C is a block diagram of an example operating environment 160 in which a client module 110 or authentication module 108 may be implemented to provide set-based biometric authentication. The illustrated operating environment 160 includes the client 102, the client module 110, the user 106, the authentication server 140, the authentication module 108, and a network 107.

Although FIG. 1C illustrates one network 107 communicatively coupled to the client 102 and the authentication server 140, in practice one or more networks 107 may be communicatively coupled to these entities.

The network 107 may include a conventional type network, a wired or wireless network, and/or may have numerous different configurations including a star configuration, token ring configuration, or other configurations. Furthermore, the network 107 may include a local area network (LAN), a wide area network (WAN) (e.g., the Internet), and/or other interconnected data paths across which multiple devices may communicate. In some instances, the network 107 may include a peer-to-peer network. The network 107 may also be coupled to or include portions of a telecommunications network for sending data in a variety of different communication protocols. In some instances, the network 107 includes Bluetooth communication networks or a cellular communications network for sending and receiving data including via short messaging service (SMS), multimedia messaging service (MMS), hypertext transfer protocol (HTTP), direct data connection, WAP, e-mail, etc.

The client 102, the client module 110, the user 106, the authentication server 140, and the authentication module 108 may be the same as those described with respect to FIGS. 1A and 1B, and so, these descriptions will not be repeated here. With combined reference to FIGS. 1A-1C, the client 102 may transmit the enrollment data 189, the confirmation data 179, the verification request 171, and the challenge answer 159 to the authentication server 140 via the network 107. Similarly, the authentication server 140 may transmit the confirmation request 185 and the verification challenge 167 to the client 102 via the network 107.

Figure 2:
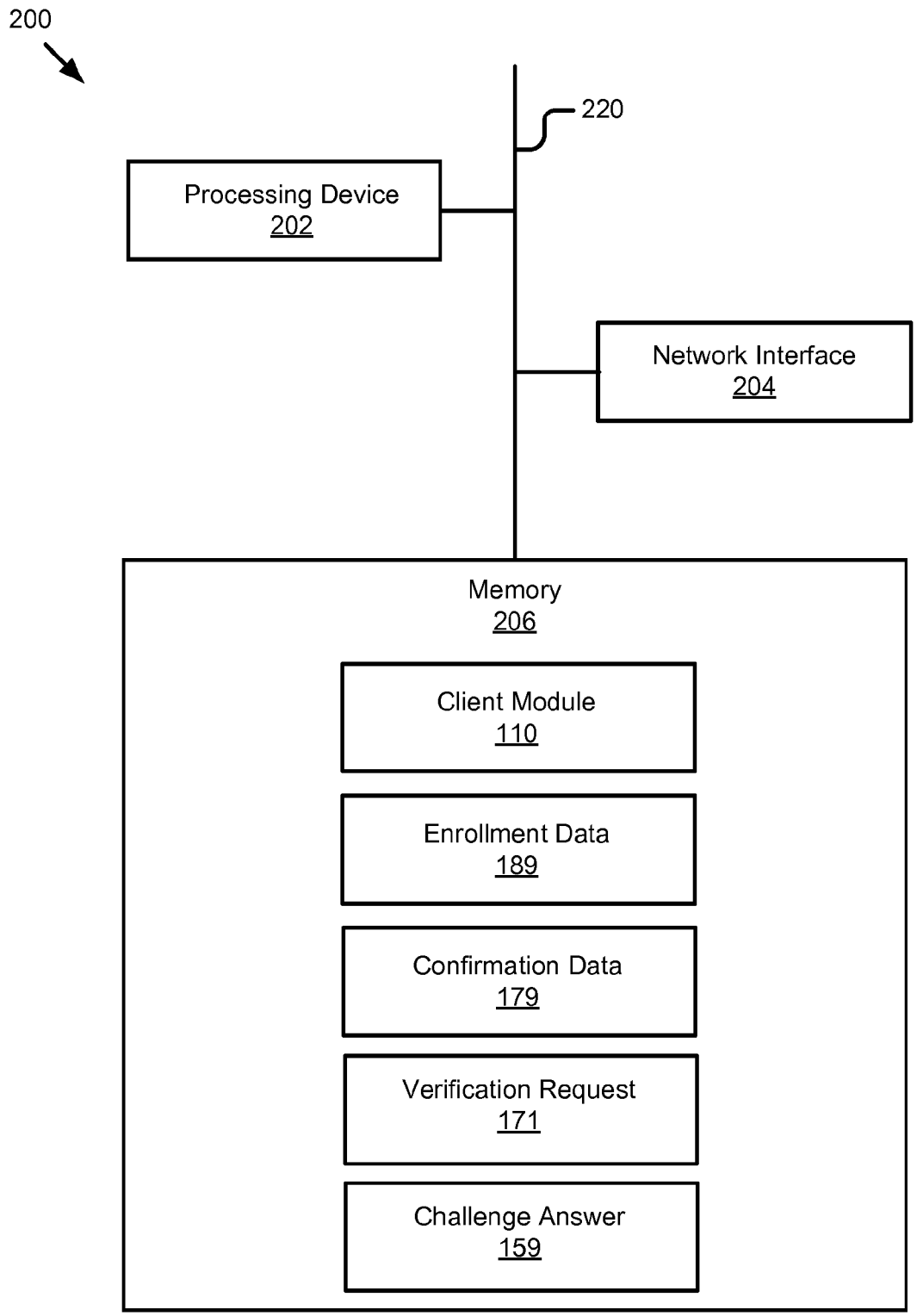
FIG. 2 is a block diagram of an example system for providing set-based biometric authentication.
Figure 3A:
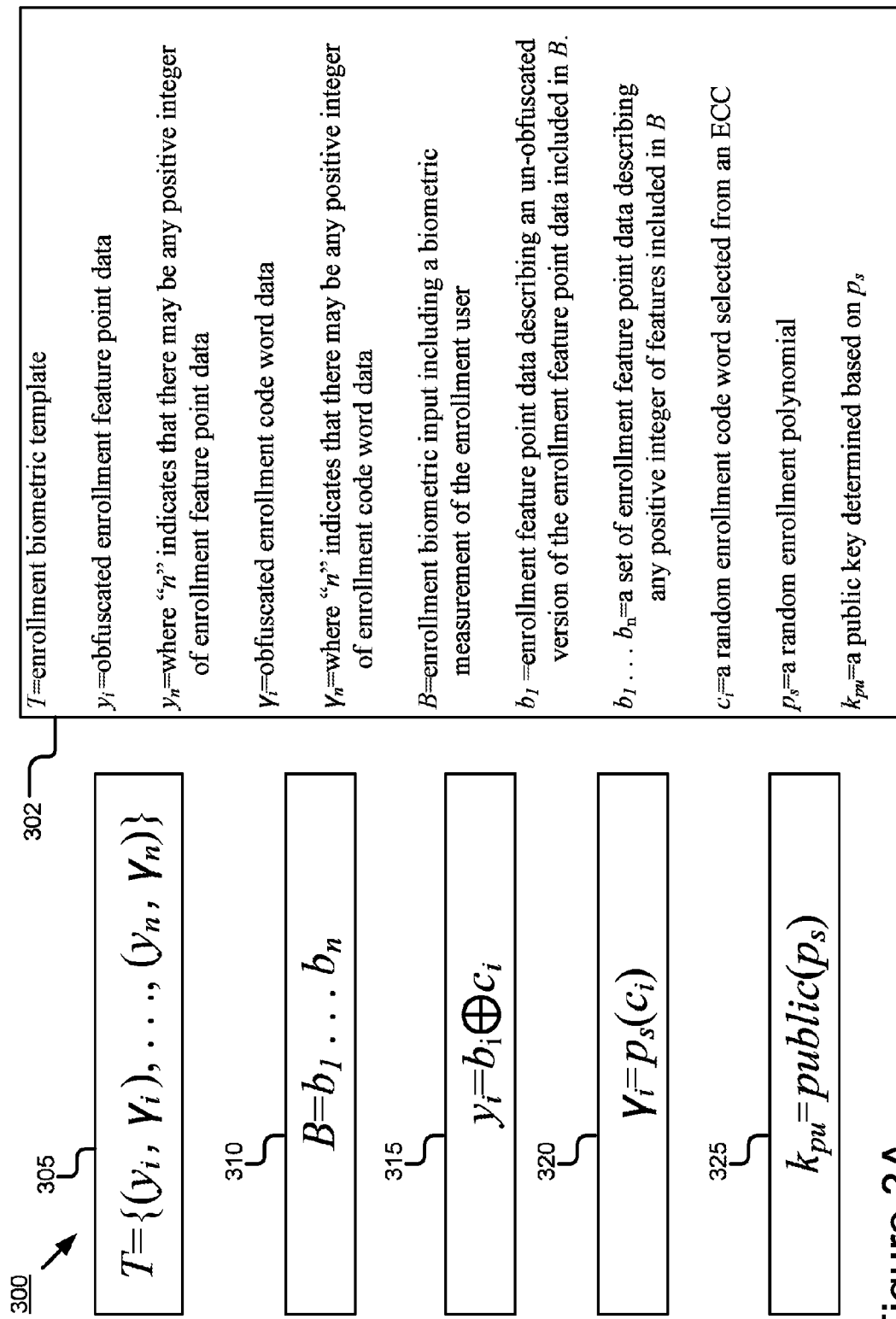
FIGS. 3A and 3B are block diagrams of example data used to authenticate a user.
Figure 3B:
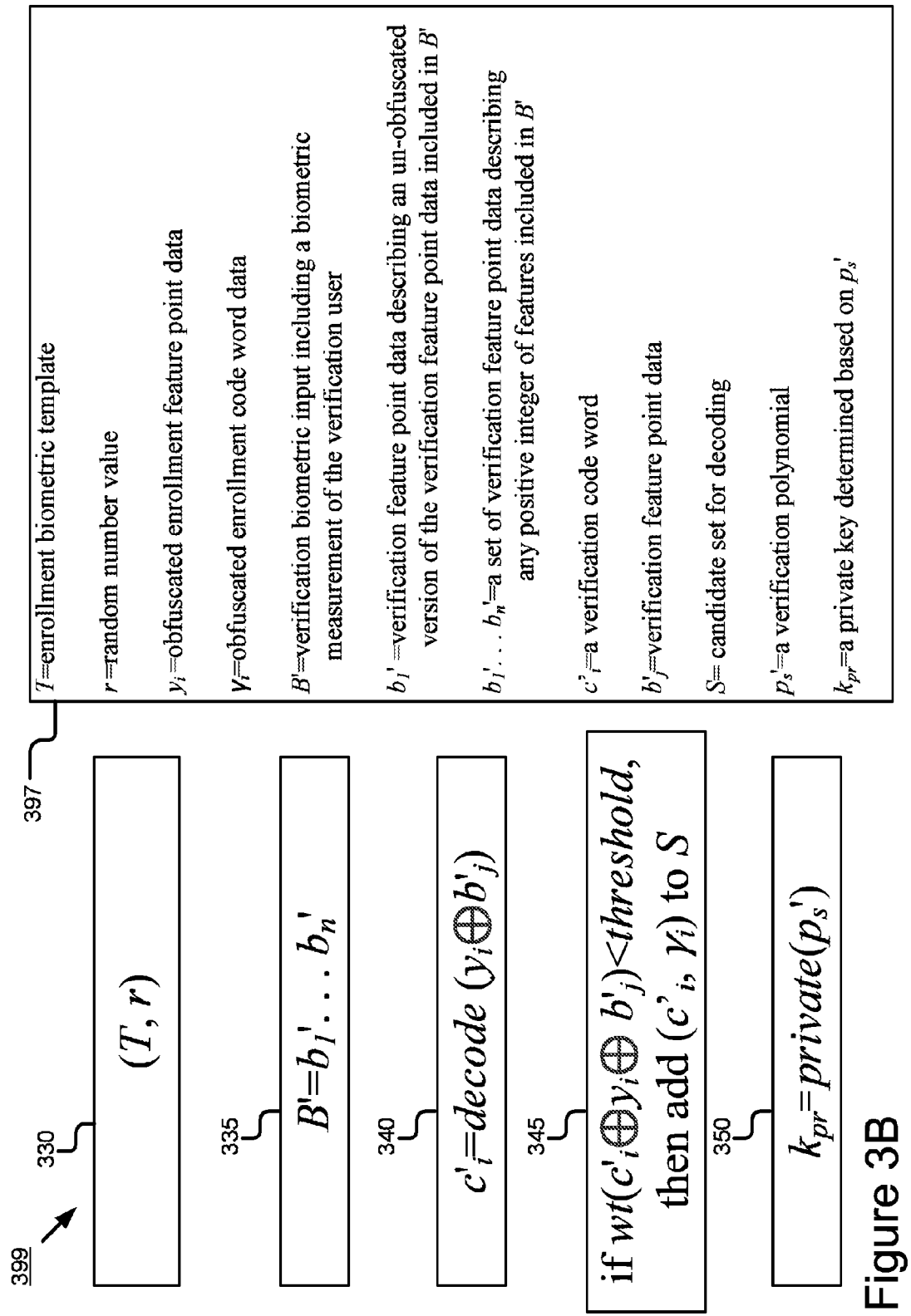

FIG. 2 is a block diagram of an example system 200 for providing set-based biometric authentication, arranged in accordance with at least one embodiment described herein. The system 200 of FIG. 2 may be an example of the client 102 described above with reference to FIGS. 1A-1C.

The system 200 may include a processing device 202, a network interface 204, and a memory 206. The various components of the system 200 may be communicatively coupled to one another via a bus 220.

The processing device 202 may include an arithmetic logic unit, a microprocessor, a general-purpose controller, or some other processor array to perform computations and provide electronic display signals to a display device. The processing device 202 processes data signals and may include various computing architectures including a complex instruction set computer (CISC) architecture, a reduced instruction set computer (RISC) architecture, or an architecture implementing a combination of instruction sets. Although FIG. 2 includes a single processing device 202, multiple processing devices 202 may be included. Other processors, operating systems, sensors, displays, and physical configurations are possible.

The network interface 204 may include hardware for enabling the system 200 to communicate with or through the network 107 of FIG. 1C. The network interface 204 may include codes and routines configured to enable the network interface 204 to provide its functionality.

The memory 206 may store instructions and/or data that may be executed by the processing device 202. The instructions and/or data may include code for performing the techniques described herein. The memory 206 may include a dynamic random access memory (DRAM) device, a static random access memory (SRAM) device, flash memory, or some other memory device. In some instances, the memory 206 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the depicted embodiment, the memory 206 may store the client module 110, the enrollment data 189, the confirmation data 179, the verification request 171 and the challenge answer 159. These components of the system 200 were described above with reference to FIGS. 1A-1C, and so, these descriptions will not be repeated here.

FIG. 3A is a block diagram of example data 300 used to authenticate a user 106. Element 305 includes an enrollment biometric template. Element 310 includes an enrollment biometric input including a biometric measuring of an enrollment user. Element 315 includes obfuscated enrollment feature point data. Element 320 includes obfuscated enrollment code word data. Element 325 includes a public key determined based on a random enrollment polynomial. Element 302 includes symbols used by elements 305-325 and an example description for each symbol according to some embodiments.

In some implementations, the client module 110 of FIGS. 1A-2 includes code and routines configured to determine one or more of the example data 300 used to authenticate a user 106.

FIG. 3B is a block diagram of example data 399 used to authenticate a user 106. Element 330 includes data included in a verification challenge. Element 335 includes a verification biometric input including a biometric measuring of a verification user. Element 340 includes a verification code word determined based on obfuscated enrollment feature point data included in the enrollment biometric template and verification feature point data included in a verification biometric input. The verification code word may be included in the candidate set for decoding. Element 345 includes a weighting process to determine whether to modify the candidate set for decoding. The client module may decode the candidate set to determine the verification polynomial. Element 350 includes a private key determined based on the verification polynomial. Element 397 includes symbols used by elements 330-350 and an example description for each symbol according to some embodiments.

In some implementations, the client module 110 of FIGS. 1A-2 includes code and routines configured to determine one or more of the example data 399 used to authenticate a user 106.

Figure 4:
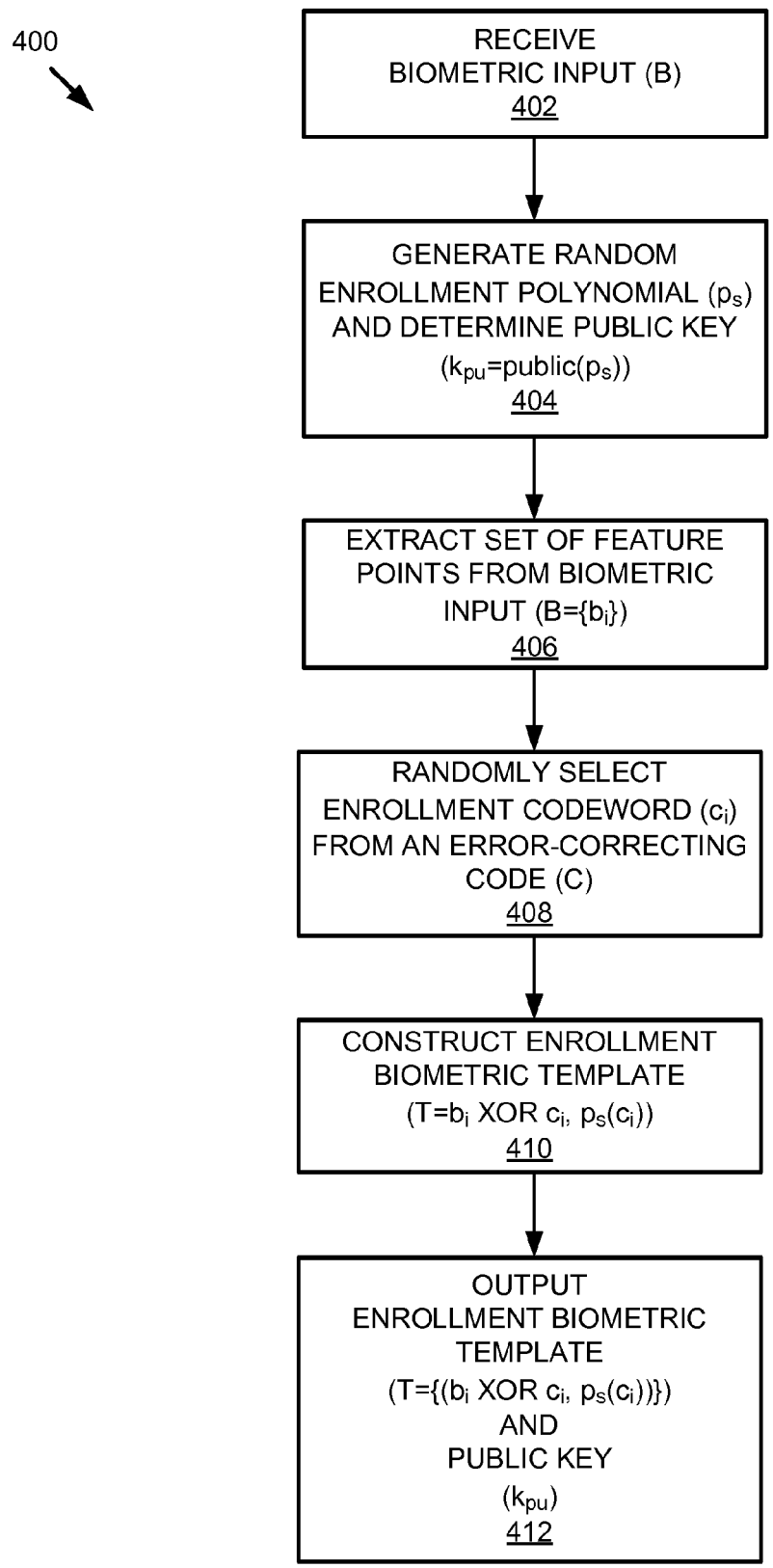
FIG. 4 shows an example flow diagram of a method of determining enrollment data for set-based biometric authentication.

FIG. 4 shows an example flow diagram of a method 400 of determining an enrollment biometric template and a public key, arranged in accordance with at least one embodiment described herein. The method 400 in some embodiments may be performed, in whole or in part, by a system such as the biometric authentication system 100 of FIGS. 1A and 1B, and/or the system 200 of FIG. 2. For instance, the processing device 202 of FIG. 2 may be programmed to execute computer instructions stored on the memory 206 to perform functions and operations as represented by one or more of the blocks of the method 400 of FIG. 4. Although illustrated as discrete blocks, various blocks may be divided into additional blocks, combined into fewer blocks, or eliminated, depending on the desired implementation.

The method 400 may begin at block 402. At block 402, the enrollment biometric input may be received. The biometric input may include the biometric measurement associated with the enrollment user.

At block 404, the random enrollment polynomial may be determined. The enrollment polynomial may be picked uniformly at random. Block 404 may also include determining the public key. The public key may be determined based on the random enrollment polynomial. For example, the random enrollment polynomial may be used as a seed to generate the public key.

At block 406, a set of feature points may be extracted from the enrollment biometric measurement included in the biometric input. The set of feature points may be described by the enrollment feature point data. The feature points may be stored as pairs. Using pairs of feature point data may provide identifying information about the feature points relative to each other instead of an absolute frame of reference which may yield rotation and/or translation invariance.

At block 408, one or more enrollment code words may be randomly selected from the ECC. In some implementations, block 408 may include randomly selecting one enrollment code word from the ECC for each feature point included in the set of feature points. The one or more enrollment code words may then be used to obfuscate the feature point data by forming obfuscated enrollment feature point data. The enrollment code words may also beneficially provide error-correction during a verification process based on the feature point data.

At block 410, an enrollment biometric template may be constructed. The enrollment biometric template may be constructed in accordance with "$T=b_i$ XOR $c_i$, $p_s(c_i)$," where the symbol "$b_i$" represents the enrollment feature point data describing the un-obfuscated version of the enrollment feature point data, the symbol "$c_i$" represents the random code word selected from the ECC, the symbol "$p_s$" represents the random enrollment polynomial, and the symbol "T" represents the enrollment biometric template. Using an XOR function for each feature point with its corresponding enrollment code word may beneficially obfuscate the feature point data and preserve the privacy of the biometric input.

The enrollment biometric template of block 410 also provides an obfuscated version of the random enrollment polynomial which is kept secret by one or more enrollment code words. In this way the random enrollment polynomial may be determined if enough of the enrollment code words are known. In this way the enrollment biometric template also includes template points that have a secret share of the random enrollment polynomial.

At block 412, the biometric enrollment biometric template and the public key may be outputted. The biometric template and the public key may be included in enrollment data for enrolling the enrollment user in a set-based authentication server. The enrollment data may also include a user ID for the enrollment user. The enrollment data may be transmitted via insecure communication since the biometric data included in the enrollment data is obfuscated and not discoverable by a party that does not have knowledge of the one or more enrollment code words or random enrollment polynomial. The enrollment data may be stored on a server whose data is publicly accessible since the biometric data of the enrollment data is not discoverable without the one or more enrollment code words or random enrollment polynomial. For example, the enrollment data may be stored on a public server implementing a public key infrastructure (PKI) scheme based on biometric.

In some implementations, one or more steps of the method 400 may be performed by the processing device 202 of system 200. The processing device 202 may be programmed to perform the one or more steps of the method 400.

Figure 5:
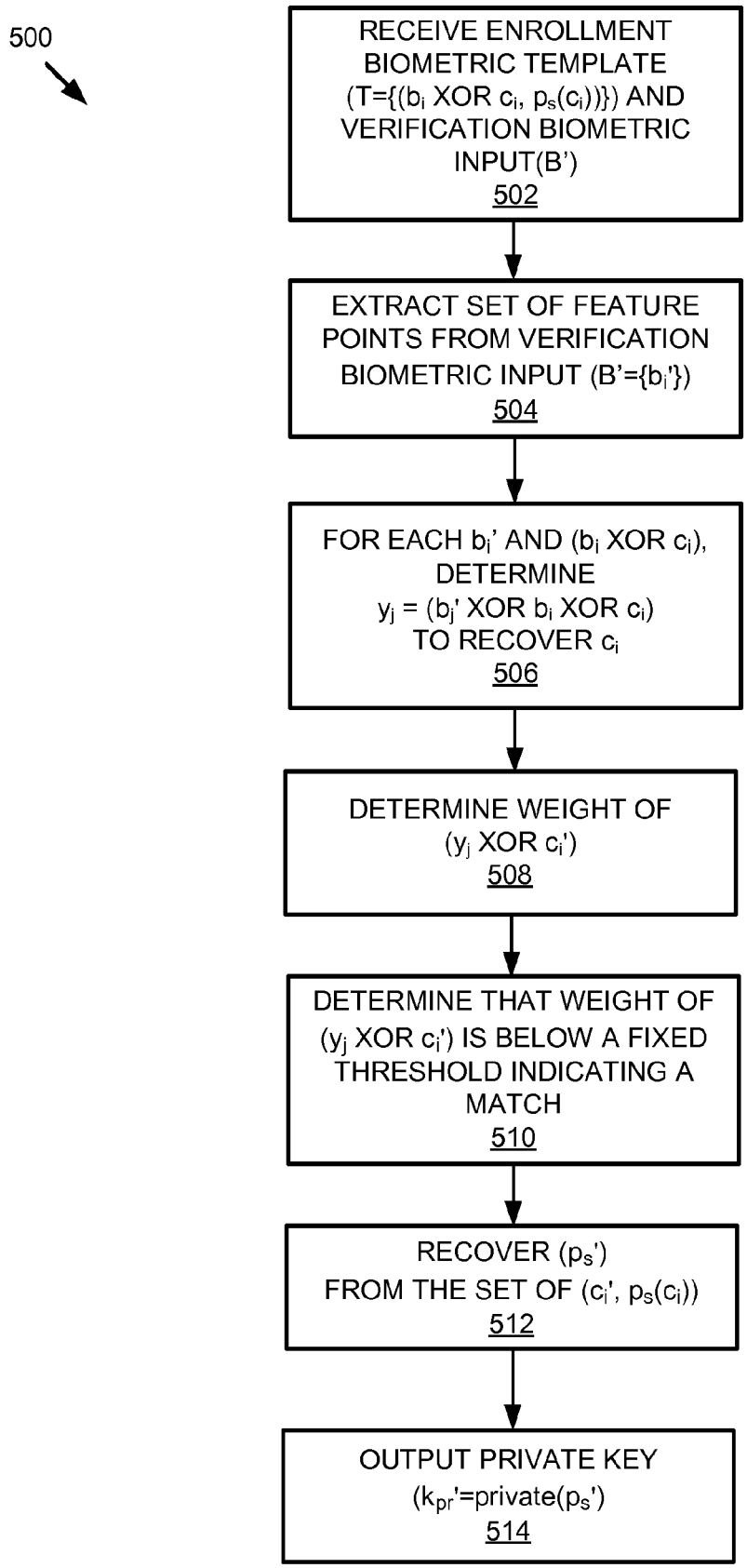
FIG. 5 shows an example flow diagram of a method of determining a private key for authenticating a user.

FIG. 5 shows an example flow diagram of a method 500 of determining a private key for authenticating a verification user, arranged in accordance with at least one embodiment described herein.

The method 500 may begin at block 502. At block 502, the enrollment biometric template may be received. Block 502 may include receiving a verification biometric input from a verification user.

At block 504, a set of feature points may be extracted from the verification biometric input. At block 506, obfuscated feature point data may be determined for each feature point extracted from the verification biometric input. The obfuscated feature point data may be determined by decoding the obfuscated feature point data based on "$y_j=(b_j'$ XOR $b_i$ XOR $c_i)$." The term "$(b_j'$ XOR $b_i)$" may decide to the difference between these two template points. If this difference is within the error-correcting capabilities of the error correction code used during enrollment of the enrollment user, then "$y_j$" will decode to "$c_i$" resulting in the verification user being authenticated as the enrollment user. However, if the difference between the template points "$b_j'$" and "$b_i$" is larger than the error-correcting capabilities of the error correction code, then "$y_j$" will decode to an incorrect code word resulting in the verification user not being authenticated as the enrollment user.

At block 508, a weight may be determined to create a candidate set for decoding. The symbols "$(y_j$ XOR $c_i')$" may include an error vector. The weight of each error vector may be determined and analyzed to determine which pairs of template points are correct matches for the enrollment biometric template.

A determination is made at block 510 that the weight is below the threshold indicating that the pairs of template points are correct matches for the enrollment biometric template.

At block 512, the verification polynomial is recovered. The verification polynomial may be recovered using a Welch-Berlekamp decoder included in the client module. The Welch-Berlekamp decoder may return the verification polynomial equal to the random enrollment polynomial if and only if the number of correct verification code words recovered at block 506 minus the number of incorrect verification code words is greater than the degree of the random enrollment polynomial.

At block 514, the private key may be determined or outputted. The private key may be determined based on the verification polynomial determined at block 512.

In some implementations, one or more steps of the method 500 may be performed by the processing device 202 of system 200. The processing device 202 may be programmed to perform the one or more steps of the method 500.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions comprise, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that various changes, substitutions, and alterations could be made hereto without departing from the spirit and scope of the invention.

What is claimed is:

1. A method comprising:
    extracting a set of enrollment feature points from an enrollment biometric measurement;
    randomly selecting one or more enrollment code words from an error correction code;
    determining obfuscated enrollment feature point data describing an obfuscated version of the set of enrollment feature points that is obfuscated using the one or more enrollment code words so that the set of enrollment feature points cannot be determined from the obfuscated enrollment feature point data without the one or more enrollment code words;
    determining obfuscated enrollment code word data describing an obfuscated version of the one or more enrollment code words that is obfuscated using a random enrollment polynomial so that the one or more code words cannot be determined from the obfuscated enrollment code word data without the random enrollment polynomial;
    determining an enrollment biometric template including the obfuscated enrollment feature point data and the obfuscated enrollment code word data;
    determining, using a processor-based computing device programmed to do the determining, enrollment data that keeps the one or more enrollment code words and the random enrollment polynomial secret, the enrollment data including the enrollment biometric template;
    extracting a set of verification feature points from a verification biometric measurement responsive to receiving a verification challenge including the enrollment data and a random number value, wherein the enrollment data is associated with an enrollment user and the verification biometric measurement is associated with a verification user attempting to authenticate as the enrollment user;
    analyzing the enrollment data to determine the obfuscated enrollment feature point data included in the enrollment biometric template of the enrollment data; and
    determining one or more verification code words based on the set of verification feature points and the obfuscated enrollment feature point data.

2. The method of claim 1, further comprising generating a public key based on the random enrollment polynomial, wherein the enrollment data includes the public key and the public key obfuscates the random enrollment polynomial.

3. The method of claim 1, wherein the enrollment data is transmitted to a server that makes the enrollment data accessible by a third party.

4. The method of claim 3, wherein the server implements a public key infrastructure (PKI) scheme based on biometrics.

5. The method of claim 1, wherein the enrollment data is transmitted via an insecure communication.

6. The method of claim 1, wherein the enrollment data is determined by a client associated with the enrollment user.

7. The method of claim 2, further comprising:
    analyzing the enrollment data to determine the public key included in the enrollment data; and
    determining a verification polynomial based on the one or more verification code words.

8. The method of claim 7, further comprising:
    determining a private key based on the verification polynomial; and
    determining a challenge answer by signing the random number value with the private key, wherein the verification user is authenticated as the enrollment user based on whether the private key corresponds to the public key to form a key pair.

9. A non-transitory computer-readable medium having computer instructions stored thereon that are executable by a processing device to perform or control performance of operations comprising:
    determining a random enrollment polynomial;
    extracting a set of enrollment feature points from an enrollment biometric measurement;
    randomly selecting one or more enrollment code words from a linear error correction code;
    determining obfuscated enrollment feature point data describing an obfuscated version of the set of enrollment feature points that is obfuscated using the one or more enrollment code words so that the set of enrollment feature points cannot be determined from the obfuscated enrollment feature point data without the one or more enrollment code words;
    determining obfuscated enrollment code word data describing an obfuscated version of the one or more enrollment code words that is obfuscated using the random enrollment polynomial so that the one or more code words cannot be determined from the obfuscated enrollment code word data without the random enrollment polynomial;
    determining an enrollment biometric template including the obfuscated enrollment feature point data and the obfuscated enrollment code word data;

generating a public key based on the random enrollment polynomial, wherein the public key obfuscates the random enrollment polynomial;

determining enrollment data that keeps the one or more enrollment code words and the random enrollment polynomial secret, the enrollment data including the enrollment biometric template and the public key;

extracting a set of verification feature points from a verification biometric measurement responsive to receiving a verification challenge including the enrollment data and a random number value, wherein the enrollment data is associated with an enrollment user and the verification biometric measurement is associated with a verification user attempting to authenticate as the enrollment user;

analyzing the enrollment data to determine the obfuscated enrollment feature point data included in the enrollment biometric template of the enrollment data;

determining one or more verification code words based on the set of verification feature points and the obfuscated enrollment feature point data;

analyzing the enrollment data to determine the public key included in the enrollment data; and determining a verification polynomial based on the one or more verification code words.

10. The non-transitory computer-readable medium of claim 9, wherein the enrollment data is transmitted to a server that makes the enrollment data accessible by a third party.

11. The non-transitory computer-readable medium of claim 9, wherein the enrollment data is transmitted via an unencrypted communication.

12. The non-transitory computer-readable medium of claim 9, wherein the enrollment data is determined by a client associated with the enrollment user.

13. The non-transitory computer-readable medium of claim 9, wherein the operations further comprise:

determining a private key based on the verification polynomial; and determining a challenge answer by signing the random number value with the private key, wherein the verification user is authenticated as the enrollment user based on whether the private key corresponds to the public key to form a key pair.

14. The non-transitory computer-readable medium of claim 13, wherein the operations are performed on a client side of a network.

15. The non-transitory computer-readable medium of claim 13, wherein the operations are performed by a client associated with the enrollment user so that authentication of the enrollment user as the verification user is performed by the client associated with the enrollment user.

16. A method comprising:

extracting a set of verification feature points from a verification biometric measurement responsive to receiving a verification challenge including enrollment data and a random number value, wherein the enrollment data is associated with an enrollment user and the verification biometric measurement is associated with a verification user attempting to authenticate as the enrollment user;

analyzing the enrollment data to determine obfuscated enrollment feature point data included in an enrollment biometric template of the enrollment data, wherein the obfuscated enrollment feature point data describes an obfuscated version of a set of feature points extracted from the enrollment biometric template and wherein the enrollment biometric template is associated with the enrollment user;

determining one or more verification code words based on the set of verification feature points and the obfuscated enrollment feature point data;

analyzing the enrollment data to determine a public key included in the enrollment data; and determining a verification polynomial based on the one or more verification code words.

17. The method of claim 16, further comprising:

determining a private key based on the verification polynomial; and determining a challenge answer by signing the random number value with the private key, wherein the verification user is authenticated as the enrollment user based on whether the private key corresponds to the public key to form a key pair.

18. The method of claim 16, wherein the enrollment data includes an enrollment biometric template, and the enrollment biometric template includes obfuscated enrollment code word data describing an obfuscated version of one or more enrollment code words, wherein the obfuscated enrollment code word data is used to obfuscate the set of feature points included in the obfuscated enrollment feature point data so that the set of feature points cannot be determined without an un-obfuscated version of the one or more enrollment code words.

* * * * *